United States Patent [19]

Tyer

[11] 4,387,752
[45] Jun. 14, 1983

[54] TREE SHEARING APPARATUS
[75] Inventor: Robert C. Tyer, Baldwin, Fla.
[73] Assignee: Rockland Manufacturing Co., Inc., Bedford, Pa.
[21] Appl. No.: 296,576
[22] Filed: Aug. 27, 1981
[51] Int. Cl.³ ............................................. A01G 23/08
[52] U.S. Cl. ................................... 144/34 E; 83/694; 83/698; 144/339; 403/DIG. 8
[58] Field of Search ............. 144/3 D, 34 R, 34 E, 144/339; 83/597, 598, 599, 694, 697, 698; 403/161, 163, 409, DIG. 8; 241/240, 241; 287/DIG. 7

[56] References Cited

U.S. PATENT DOCUMENTS

| | | | |
|---|---|---|---|
| Re. 23,895 | 11/1954 | Winget | 37/2 |
| 1,689,750 | 10/1928 | Redfield | 287/DIG. 7 |
| 2,955,631 | 10/1960 | Hoadley | 144/34 E |
| 3,527,272 | 9/1970 | Hamilton | 144/3 D |
| 3,552,786 | 1/1971 | Shmid | 403/161 |
| 3,625,628 | 12/1971 | Kempe | 144/34 |
| 3,707,895 | 1/1973 | McElderry | 83/623 |
| 3,720,249 | 3/1973 | Peltonen | 144/339 |
| 3,773,396 | 11/1973 | Easley | 308/187 |
| 3,804,476 | 4/1974 | Nakamura et al. | 308/187 |
| 4,063,359 | 12/1977 | Lascombe | 144/34 R |
| 4,131,144 | 12/1978 | Fischer | 144/34 E |
| 4,188,721 | 2/1980 | Ramun et al. | 30/134 |
| 4,210,183 | 7/1980 | Nilsen | 144/34 E |

Primary Examiner—W. D. Bray
Attorney, Agent, or Firm—Lalos, Leeds, Keegan, Lett & Marsh

[57] ABSTRACT

A tree shearing apparatus including a main frame mountable on support arms of a machine, a pair of pivot pins mounted on the main frame, a blade support arm mounted on each of the pivot pins for pivotal movement about the axis of that pivot pin, a cutting blade having a leading cutting edge mounted on each of the blade support arms, an element mounted on the main frame that pivots the blade support arm thereby moving the leading cutting edges toward and away from each other, causing the leading cutting edges to sever a tree trunk or the like positioned between them, and an element mounted on the main frame and operatively connected to at least one of the pivot pins that adjusts the attitude of the pivot pin and correspondingly adjusts the inter-relationship of the positions of the leading cutting edges of the blades.

28 Claims, 10 Drawing Figures

TREE SHEARING APPARATUS

This invention relates to an apparatus for shearing trees and more particularly to a vehicle-mounted tree shearing apparatus which can firmly hold the tree as it shears it. It further relates to blade assemblies for such an apparatus.

Tree shearing devices have been developed that can be attached to the front of vehicles for felling trees. Typically they include a pair of blade support arms which can be moved towards and away from each. Blades are removably mounted in the arms with their cutting edges facing each other. Thus, when a tree trunk is positioned between the opened arms and the arms are subsequently closed, the blades penetrate through opposite sides of the trunk, either horizontally or at slightly downward angles. The blades thereby meet and cleanly cut through an entire cross-section of the trunk.

The blades mounted on the support arms must be aligned so that they penetrate through an entire cross-section of the trunk and cut it quickly and completely. Usually though the blades are misaligned either because of poor fabrication techniques or poor quality control or due to heavy use. Such misalignment means that in order to cut the trunk completely, the operator must either withdraw the blades and insert them at a slightly different and possibly intersecting location, or he must shake the tree with the machine to cause the uncut fibers to break. This misalignment can also cause the jaws to spring or can result in undue wear in the jaw hinge pin bearings or bushings.

These devices can also have one or more pairs of grasping arms mounted on the same frame as the blade support arms and typically above the support arms. These grasping arms are positioned to firmly hold a tree while it is being sheared near the ground and while the sheared tree is moved to the desired location.

These blades have also been found to deflect, usually upwardly, when cutting a tree, causing the blades to deform. This deformation results in the leading sharp cutting edge of the blade not following the desired path through the trunk. Further misalignment of the blades may also result from this deformation.

In the past, the pivot points of the jaws have been positioned in front of the boom pivot points. However, this design results in a reduced carrying capacity for the machine. When a heavy load is being carried, the machine may tilt, since the load is located a distance from the center of gravity of the machine. Additionally, the large angle between the blades as they shear a tree resulting from this design exerts a large undesirable backward force against the vehicle. This relative positioning of the pivot points also means a long stroke cycle.

The pivot pins of the blade arms have required a separate lubricating assembly. This means that additional structures must be used including fluid lines which can get in the way of the pivoting, moving members and can get tangled in the brush as the vehicle moves through the woods. This separate assembly requires periodic maintenance as well.

Accordingly, it is the principal object of the present invention to provide an improved tree shearing apparatus.

Another object of the present invention is to provide an improved blade assembly.

A further object of the present invention is to provide a tree shearing apparatus with cutting blades which can be realigned relative to each other to ensure a complete shearing of the tree trunk.

A still further object of the present invention is to provide a tree shearing apparatus whose blades are removably, but securely, mounted and are less subject to being deformed.

Another object of the present invention is to provide a tree shearing apparatus with grasping arms which can carry larger loads without tilting the vehicle.

A further object of the present invention is to provide an improved tree shearing apparatus which has a reduced cycle time and thus is more efficient.

A still further object of the present invention is to provide an improved tree shearing apparatus requiring less maintenance.

Another object of the present invention is to provide a novel, more efficient cutting blade design.

Other objects and advantages of the present invention will become more apparent to those persons having ordinary skill in the art to which the present invention pertains, from the following description taken in conjunction with the accompanying drawings wherein.

Figure 1:
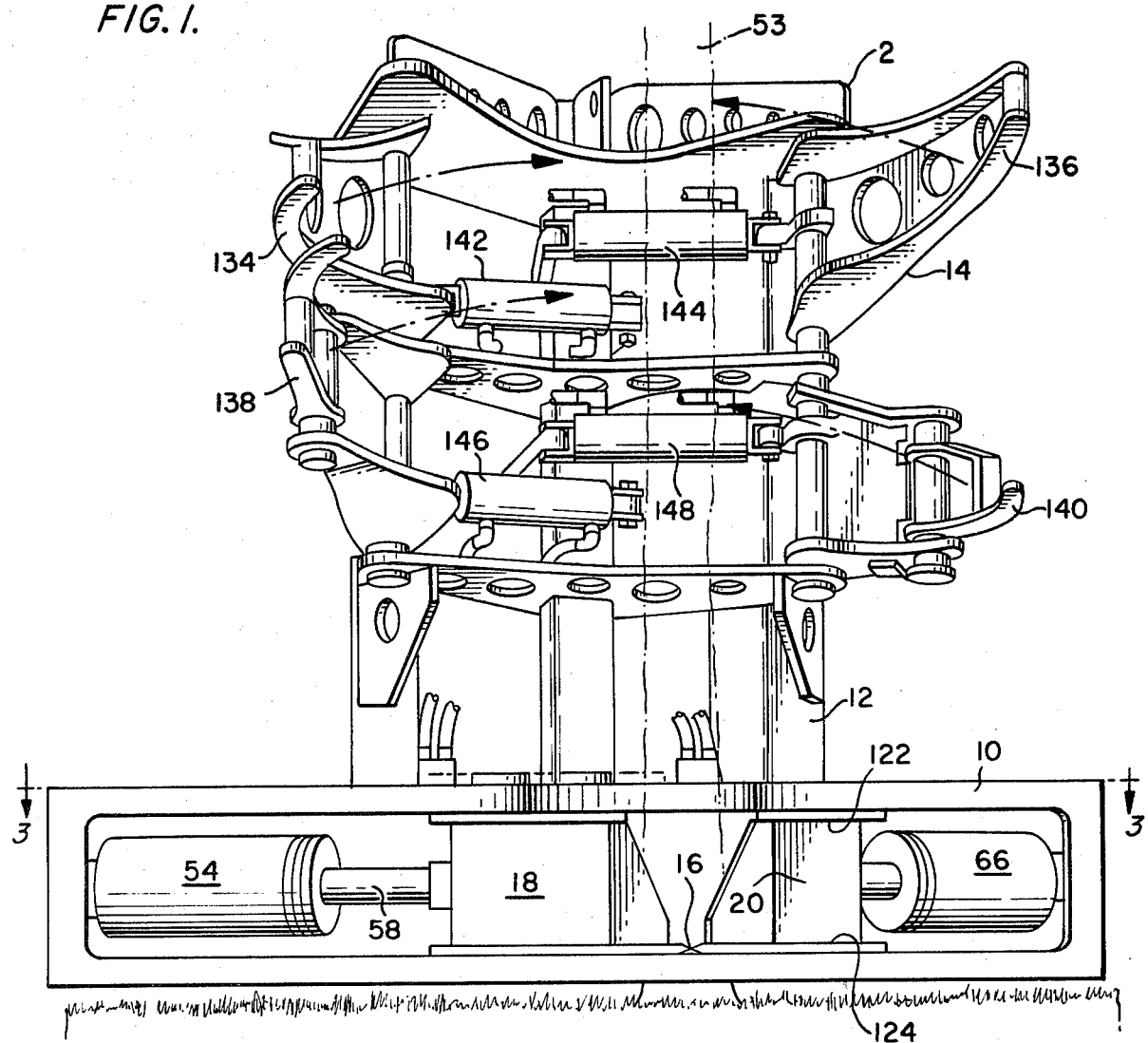
FIG. 1 is a perspective view of an embodiment of the present invention.
Figure 3:
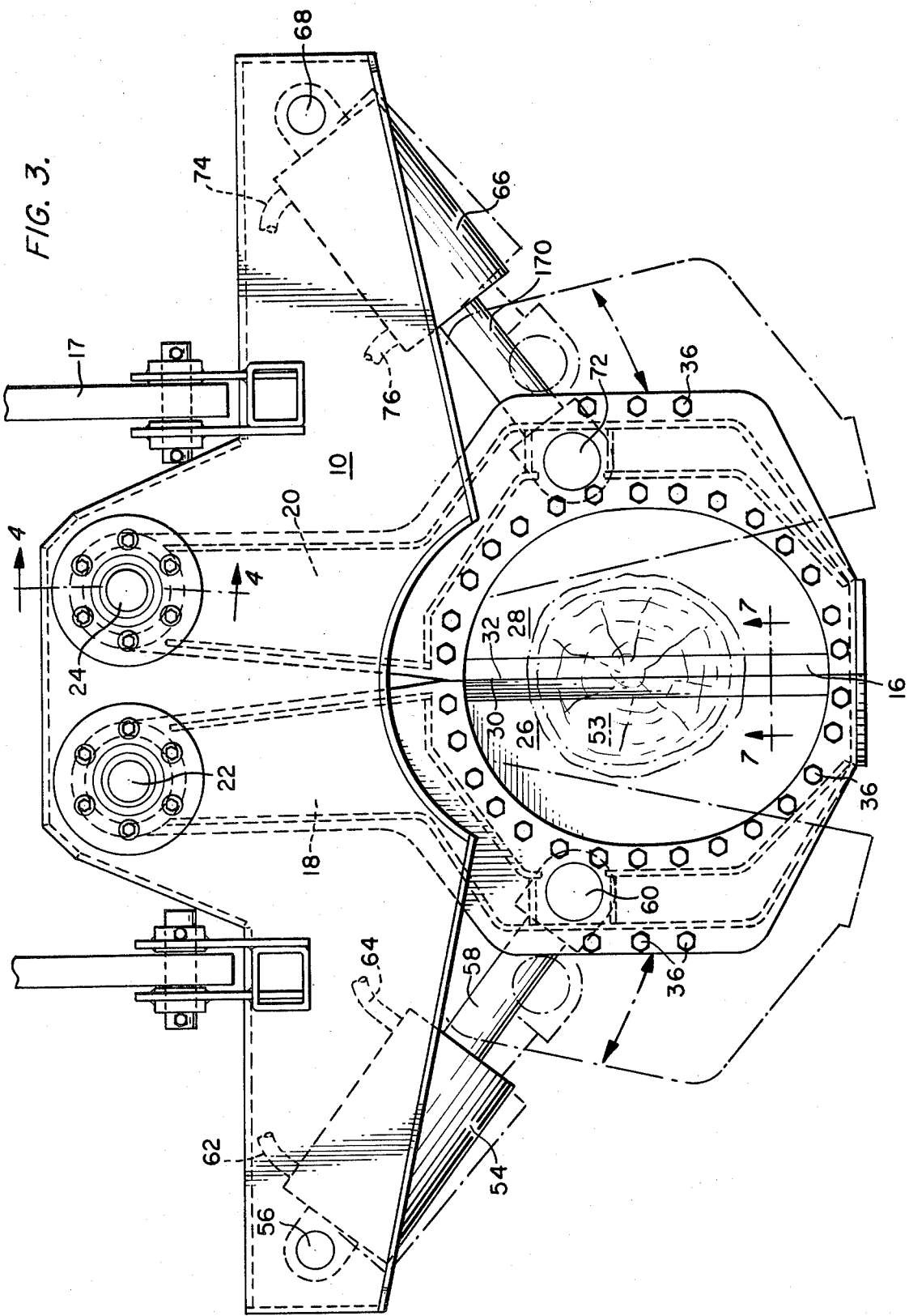
FIG. 3 is a top plan view taken along line 3—3 in FIG. 1, illustrating the blade support arms being closed thereby shearing the tree trunk positioned between them.

Referring to FIG. 1, there is shown a tree shearing apparatus 2 embodying the present invention. The apparatus generally includes a main frame 10, a mast 12 mounted on and above main frame 10, a gripping or clamping means shown generally at 14 mounted on mast 12, and a shearing or cutting means shown generally at 16 mounted on main frame 10. As best shown in FIG. 3, main frame 10 is tiltably mounted on support arms 17, 17 of the vehicle (not shown), e.g. a track equipped tractor or a front end loader.

Figure 8:
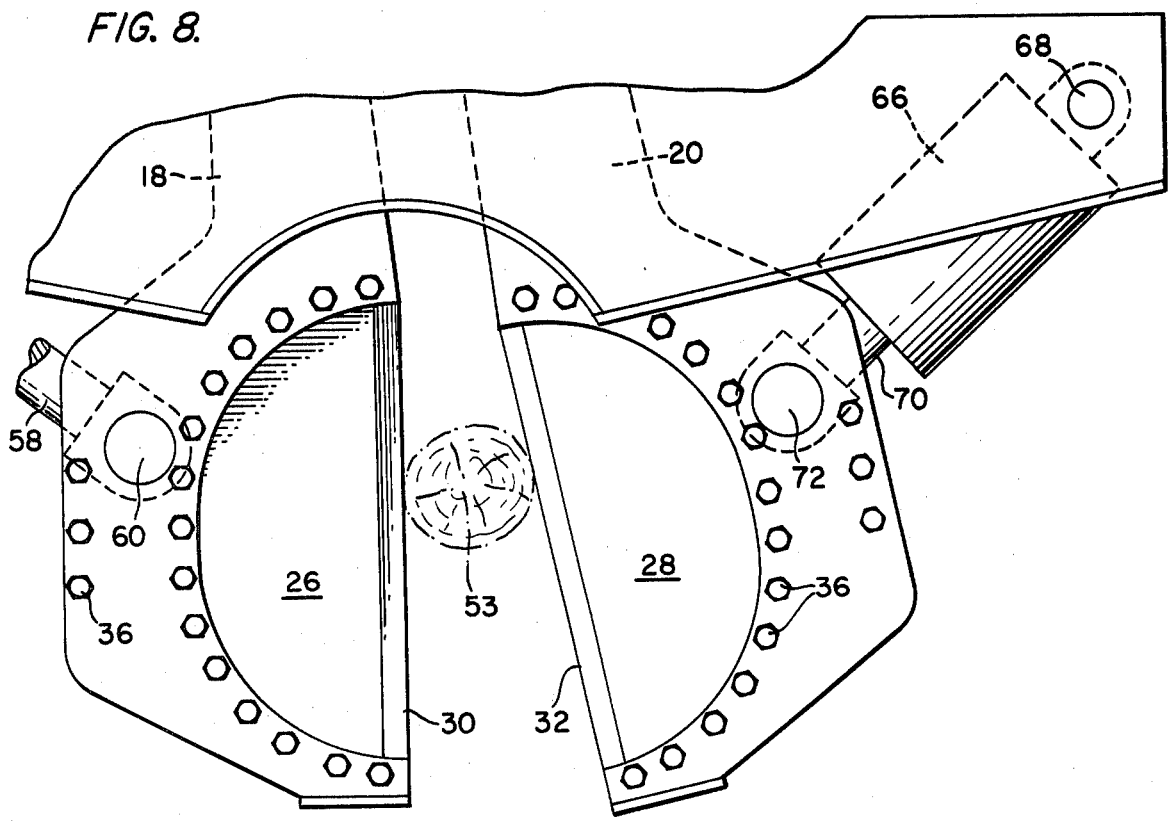
FIG. 8 is a view similar to FIG. 3 but showing the blades misaligned.

As best shown in FIG. 3, shearing means 16 includes a pair of blade support arms 18 and 20 which are pivotally connected to pivot pin assemblies 22 and 24 respectively. Pivot pin assemblies 22 and 24 are positioned on the main frame inwardly and rearwardly of the connections of the main frame and the vehicle support arms. Blades 26 and 28 are mounted on blade support arms 18 and 20. The blades are mounted so that their leading cutting edges 30 and 32 cut in a fashion shown in FIG. 3. If the blades are not properly aligned, as illustrated in FIG. 8, additional cutting times and forces are required.

Figure 6:
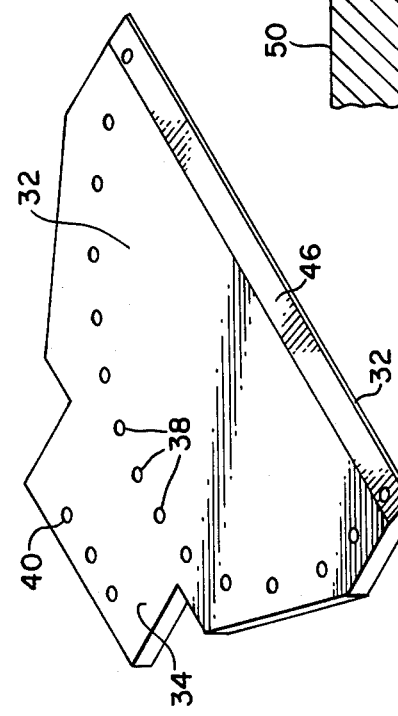
FIG. 6 is a perspective view of the replaceable cutting blade of the present invention.

The cutting blades are designed to be removably attached to the blade support arms for ease in repair and replacement. As best shown in FIG. 6, blade 26 has a main portion 32 and a support portion 34. The blades are fastened to the blade support arms by nut and bolt, or equivalent, fasteners 36. The fasteners pass through holes in the blades. The holes are positioned in an arc arrangement 38 in the main portion as well as in a line 40 in the support portion 34 generally parallel to the cutting edge. This blade and fastener design, again referring in particular to FIG. 6, provides for greater blade strength and resists bending of the blade due to heavy use.

Figure 7:
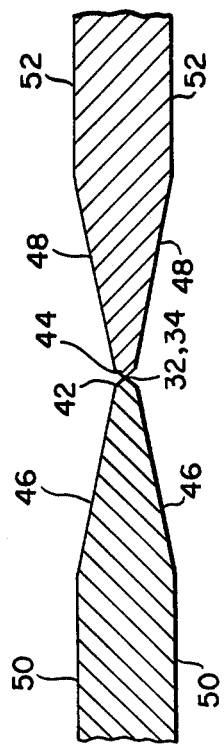
FIG. 7 is a cross-sectional view of the leading cutting edges of the blades taken along line 7—7 in FIG. 3.

FIG. 7 shows the blade's cutting surface arrangement in an aligned position. It provides for initial cutting surfaces 42 and 44 followed by more gently sloping surfaces 46 and 48. The surfaces 50 and 52, even further from the initial cutting surface, are parallel or nearly so. This arrangement provides a very effective cutting action for tree trunks 53 of both small and large diameters.

Figure 2:
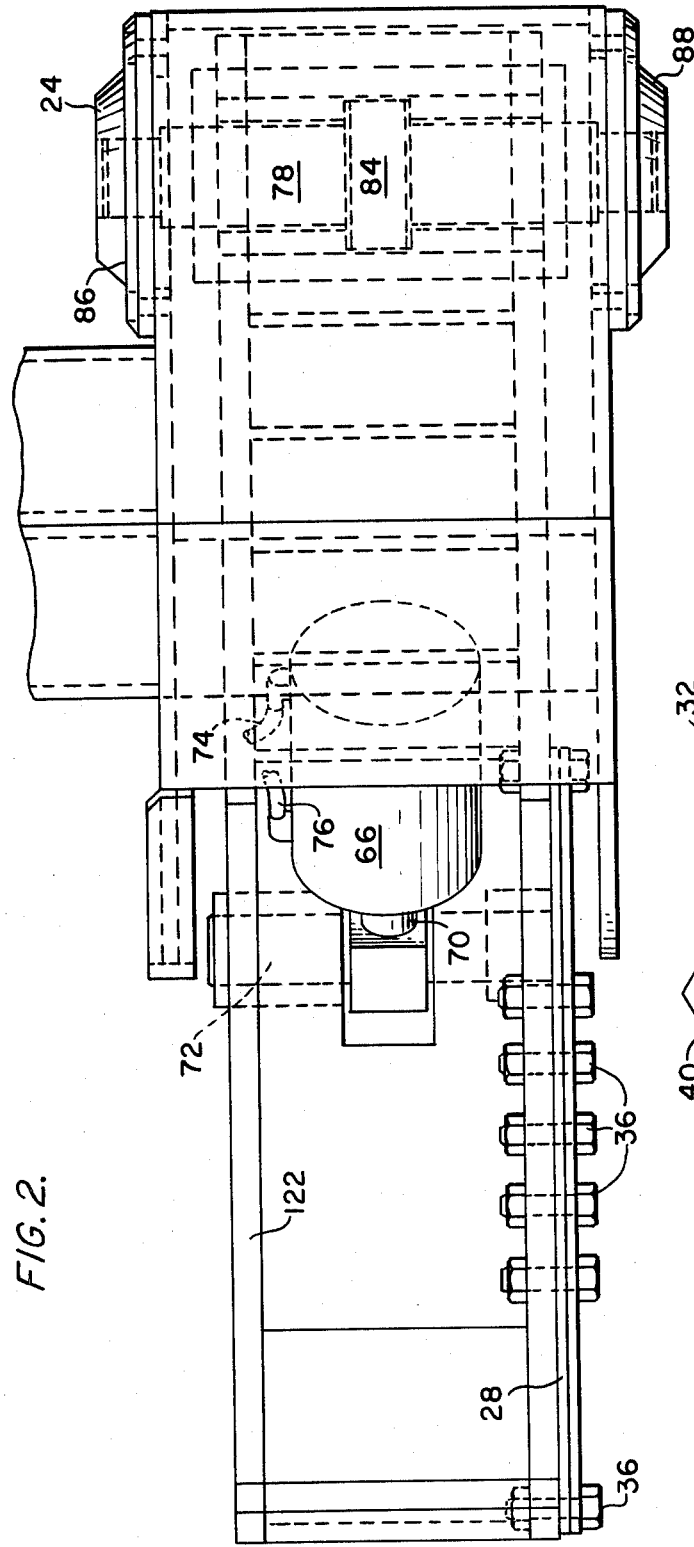
FIG. 2 is a side elevational view of FIG. 3.

Referring to FIG. 3, hydraulic cylinder assembly 54 is pivotally connected to main frame 10 through pin 56. The rod portion 58 is pivotally connected to blade support arm 18 at blade support arm pin 60. Hydraulic fluid lines 62 and 64 form part of a suitable hydraulic circuit extending to a pressure source (not shown) aboard the vehicle. A parallel arrangement is provided for blade support arm 20 including hydraulic cylinder assembly 66, pin 68, rod 70, pin 72, and fluid lines 74 and 76, as illustrated in FIGS. 2 and 3. Pins 56 and 68 are mounted on main frame 10 outside of the connections of main frame 10 to vehicle support arms 17, 17. The hydraulic cylinders 54 and 66 are adjusted so that rod portions 58 and 70 apply even and simultaneous forces to blade support arms 18 and 20 respectively. As best shown in FIG. 3, this causes a smooth efficient cutting action. The hydraulic cylinders cause the blade support arms, as previously discussed, to pivot about pivot pin assemblies 22 and 24. One feature of the present invention allows these pivot pin assemblies to be adjusted to correct any blade misalignments.

Figure 4:
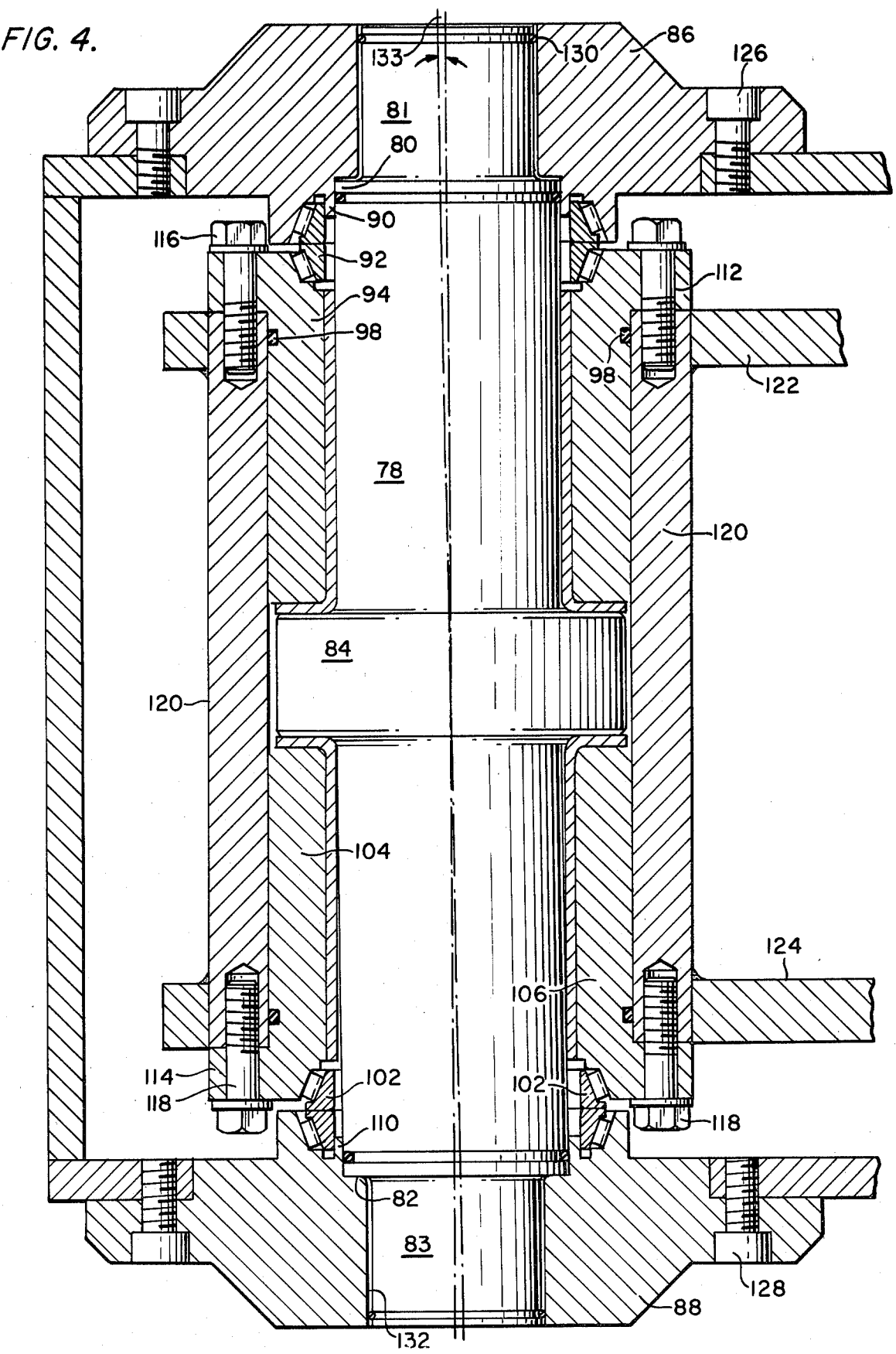
FIG. 4 is a side view of a pivot pin assembly taken along line 4—4 in FIG. 3.
Figure 9:
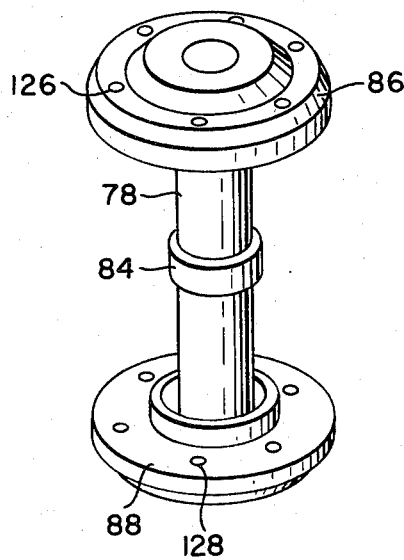
FIG. 9 is a perspective view of the pin mounting assembly.

As illustrated in FIGS. 4 and 9, pivot pin assembly 24 includes, inter alia, a pin 78 having upper shoulder 80, upper end 81, lower shoulder 82, lower end 83 and collar 84, an upper cap 86, and a lower cap 88. Cap 86 has a seal seat surface 90 on which upper roller metal seal 92 is positioned. Thrust bearing member 94 having seal seat 96 and o'ring 98 is positioned between metal seal 92 and shaft collar 84. Similarly, lower cap 88 has seal seat surface 100 against which lower roller metal seal 102 is positioned. Thrust bearing member 104 having seal seat 106 and o'ring 108 is located between collar 84 and roller metal seal 102. Flange portions 112 and 114 of the thrust bearing members include holes which bolts 116 and 118 pass through and into jaw tube 120 whereby jaw tube 120 is secured therebetween. The jaw tube arrangement includes a lubricant reservoir whereby the pivot pin assembly has its own "permanently" sealed lubricating system, the o'rings holding the lubricant within the "system." Upper and lower jaw plates 122 and 124 are welded to jaw tube 120. The cutting blades are mounted on the lower jaw plates.

Figure 5:
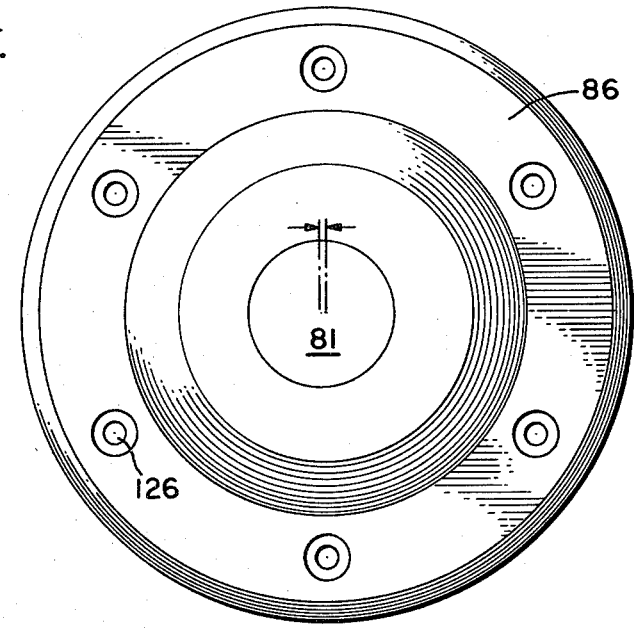
FIG. 5 is a top plan view of the pivot pin assembly.
Figure 10:
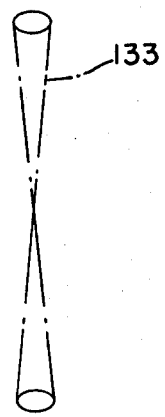
FIG. 10 is a side elevational view of the adjustable axis of the pivot pin.

Upper cap 86 and lower cap 88 are provided with bolt hole circles 126 and 128 positioned over each other forming a vertical centerline relative to the main frame. The caps also include vertical openings 130 and 132 having centerpoints offset slightly—about ⅛" in the present embodiment—from the aforementioned vertical centerline, as best shown in FIG. 5. When the offsets of openings 130 and 132 are not in vertical alignment, the axis of pin rotation 133 is formed eccentric to the vertical centerline, as best shown in FIGS. 4 and 10. By rotating one or both of the caps, the pin rotation axis is altered which adjusts the disposition of jaw plate 124, as shown in FIG. 4, to which the blade is bolted. Thus, by adjusting one or both of the pivot pin assemblies, the relative alignment of the blades can be adjusted. Also, the upper and lower shoulders 80 and 82 and pin collar 84 prevent any vertical pin movement along the pin's axis. Vertical openings 130 and 132 are of slightly larger diameters than the pin end portions 81 and 83 which are received therein so that the pin is not held so tightly that it cannot be tilted.

Clamping means 14 includes semi-circular shaped arms 134, 136, 138 and 140 each of which is pivotally connected to the mast. Each of the hydraulic cylinder assemblies 142, 144, 146 and 148 is operatively connected to one of the arms. The hydraulic cylinder assemblies are controlled by the vehicle operator who can cause the positioned arms to grip tree trunk 53 maneuvered between them and hold it firmly between the open blade arms beneath for shearing. The arms then hold the sheared tree while the vehicle moves it to another location and releases it when that location is reached.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A tree shearing apparatus comprising a main frame mountable on support arms of a machine, a pair of pivot pins mounted on said main frame, a blade support arm mounted on each of said pivot pins for pivotal movement about the axis of said pivot pin, a cutting blade having a leading cutting edges mounted on each of said blade support arms, means mounted on said main frame for pivoting said blade support arms for moving said leading cutting edges toward and away from each other, causing said leading cutting edges to sever a tree trunk or the like positioned therebetween, and means mounted on said main frame and operatively connected to at least one of said pivot pins for adjusting the attitude of said pivot pin and correspondingly adjusting the interrelationship of the positions of said leading cutting edges of said blades.

2. An apparatus according to claim 1 wherein said pivot pins are disposed rearwardly of connections of said main frame to the support arms of said machine.

3. An apparatus according to claim 1 wherein at least one of said cutting blades is detachably mounted on its associated blade support arm.

4. An apparatus according to claim 1 wherein at least one of said cutting blades is secured to its associated blade support arm by fastening means disposed along a predetermined positioning line, and wherein said cutting blade includes a body portion disposed on a side of said positioning line away from said cutting edge thereof, and wherein said body portion also is secured to said body portion by fastening means.

5. An apparatus according to claim 4 wherein said positioning line forms an arc and both of said fastening means comprise bolt and nut fasteners.

6. An apparatus according to claim 1 wherein said leading cutting edges of said blades are rectilinear.

7. An apparatus according to claim 1 wherein said pivoting means comprises a hydraulic cylinder assembly operatively interconnecting said main frame and said blade support arm.

8. An apparatus according to claim 7 wherein said pivot pins are mounted on said main frame inwardly and rearwardly of the connections of said main frame and the support arms of said machine, and the connections of said cylinder assemblies to said main frame are disposed outwardly of said connection of said main frame to said support arms of said machine.

9. An apparatus according to claim 1 wherein said pivoting means is operatively connected to the midsection of at least one of said blade support arms.

10. An apparatus according to claim 1 including a mast mounted on said main frame and means mounted on said mast for selectively gripping a tree trunk or the like positioned between said cutting blades.

11. An apparatus according to claim 10 wherein said gripping means includes at least one set of clamping arms pivotally mounted on said mast and means for selectively pivoting said clamping arms into and out of embracing relationship with said tree trunk.

12. An apparatus according to claim 11 wherein said clamping arms pivoting means comprises hydraulic cylinder assemblies operatively interconnecting said mast and said clamping arms.

13. An apparatus according to claim 1 wherein said attitude adjusting means includes at least one pin mounting member mounted on said main frame, said pin mounting member having means for rotatably adjusting the angular position thereof relative to said main frame about a predetermined axis of rotation, and a pin receiving opening disposed eccentrically relative to said axis of rotation, and wherein an end portion of one of said pivot pins is disposed in said pin receiving opening whereby upon rotatably adjusting said pin mounting member about the rotational axis thereof, the attitude of said pivot pin will alter to correspondingly alter the interrelationship of the leading cutting edges of said blades.

14. An apparatus according to claim 1 wherein said attitude adjusting means includes at least one pair of vertically spaced pin mounting members mounted on said main frame, each of said pin mounting members having means for rotatably adjusting the angular position thereof relative to said main frame about a predetermined axis of rotation, and a pin receiving opening disposed eccentrically of said axis of rotation, and wherein end portions of one of said pivot pins are received in said pin receiving openings whereby upon rotatably adjusting either or both of said pin mounting members about said rotational axis thereof, the attitude of said pivot pin will alter to correspondingly alter the interrelationship of the leading cutting edges of said blades.

15. An apparatus according to claim 14 wherein said pivot pin includes means engageable with said blade support member for preventing relative displacement between said blade support member and said pivot pin along the axis of said pivot pin.

16. An apparatus according to claim 14 including means for preventing relative displacement between said main frame and said pivot pin along the axis of said pivot pin.

17. An apparatus according to claim 15 wherein said means for preventing relative displacement between said pivot pin and said blade support arm member comprises a collar portion of said pivot pin providing surfaces engageable with said blade support arm member.

18. An apparatus according to claim 16 wherein said means for preventing relative displacement between said pivot pin and said main frame comprises shoulders formed on said pivot pin engageable with said main frame.

19. An apparatus according to claim 13 or claim 14 wherein said pin receiving opening is of slightly larger dimensions than said end portions whereby the attitude of said pivot pin can be altered.

20. A blade assembly for a tree shearing apparatus comprising a blade support arm having means for pivotal connection to a frame of said apparatus, a blade having a leading cutting edge mounted on said blade support arm, first means for fastening said blade on said blade support arm, said first fastening means being disposed along a predetermined line, said blade having a portion disposed on a side of said line of first fastening means away from said leading cutting edge, and second means for fastening said blade portion to said blade support arm.

21. A blade assembly according to claim 20 wherein said first fastening means are spaced arcuately.

22. A blade assembly according to claim 20 wherein said first and second fastening means comprise threaded fasteners.

23. An assembly for pivotally connecting a blade support arm member of a tree shearing apparatus to a main frame thereof comprising a pin and a pair of vertically spaced pin mounting members mounted on said main frame, each of said pin mounting members having means for rotatably adjusting the angular position thereof relative to said main frame about a predetermined axis of rotation, and a pin receiving opening disposed eccentrically of said axis of rotation, said pin having end portions received in said pin receiving openings whereby upon rotatably adjusting either or both of said pin mounting members about said rotational axis thereof, the attitude of said pin will alter to correspondingly alter the position of the blade support arm member relative to said main frame.

24. An assembly according to claim 23 wherein said pin includes a collar portion providing a pair of annular shoulders, and including a pair of annular bearings each mounted on said pin and interposed between an annular shoulder of said pin collar and said blade support arm member.

25. An assembly according to claim 24 wherein the end portions of said pin are reduced to provide annular shoulders engageable with said pin mounting members for preventing relative displacement between said pin and said pin mounting members along the axis of said pin.

26. An assembly according to claim 24 including a seal disposed at an end of said pin and seated in both said main frame and said blade support arm member.

27. An assembly according to claim 24 wherein said pin mounting members include annular portions received within aligned circular openings in said main frame member, disposed concentrically relative to said axis of rotation, and bolt circles disposed concentrically relative to said axis of rotation, and including sets of bolts threaded into registered threaded bolt holes in said pin mounting members and said main frame, spaced along said bolt circles.

28. An assembly according to claim 23 wherein at least one of said pin mounting members includes a pivot pin lubricating assembly sealed within said member.

* * * * *